United States Patent
Paz-Kagan et al.

(10) Patent No.: US 12,332,167 B2
(45) Date of Patent: Jun. 17, 2025

(54) METHOD FOR ASSESSING NITROGEN NUTRITIONAL STATUS IN PLANTS BY VISIBLE-TO-SHORTWAVE INFRARED REFLECTANCE SPECTROSCOPY OF CARBOHYDRATES

(71) Applicant: THE STATE OF ISRAEL, MINISTRY OF AGRICULTURE & RURAL DEVELOPMENT, AGRICULTURAL RESEARCH ORGANIZATION (ARO) (VOLCANI CENTER), Rishon Lezion (IL)

(72) Inventors: Tarin Paz-Kagan, Meitar (IL); Or Sperling, Beit Kama (IL); Ze'ev Schmilovitch, Yehud (IL); Uri Yermiyahu, Yavne (IL); Tal Rapaport, Lehavim (IL)

(73) Assignee: THE STATE OF ISRAEL, MINISTRY OF AGRICULTURE & RURAL DEVELOPMENT, AGRICULTURAL RESEARCH ORGANIZATION (ARO) (VOLCANI CENTER), Rishon Lezion (IL)

(*) Notice: Subject to any disclaimer, the term of this patent is extended or adjusted under 35 U.S.C. 154(b) by 244 days.

(21) Appl. No.: 17/801,868

(22) PCT Filed: Mar. 1, 2021

(86) PCT No.: PCT/IL2021/050236
§ 371 (c)(1),
(2) Date: Aug. 24, 2022

(87) PCT Pub. No.: WO2021/176452
PCT Pub. Date: Sep. 10, 2021

(65) Prior Publication Data
US 2023/0078617 A1    Mar. 16, 2023

Related U.S. Application Data

(60) Provisional application No. 62/983,677, filed on Mar. 1, 2020.

(51) Int. Cl.
*G01N 21/35* (2014.01)
*G01N 1/28* (2006.01)
(Continued)

(52) U.S. Cl.
CPC .......... *G01N 21/35* (2013.01); *G01N 1/4044* (2013.01); *G01N 2001/2866* (2013.01);
(Continued)

(58) Field of Classification Search
CPC ............... G01N 21/35; G01N 1/4044; G01N 2001/2866; G01N 2021/3155; G01N 2021/8466; G01N 2201/129; G01N 21/31
(Continued)

(56) References Cited

U.S. PATENT DOCUMENTS

| | | | |
|---|---|---|---|
| 2009/0305423 A1* | 12/2009 | Subramanian | G01N 33/04 436/22 |
| 2010/0148048 A1* | 6/2010 | Abbas | G01N 21/3554 250/252.1 |

(Continued)

FOREIGN PATENT DOCUMENTS

| | | | |
|---|---|---|---|
| BR | 102018076613 A2 * | 7/2020 | |
| CN | 101382488 A | 3/2009 | |

(Continued)

OTHER PUBLICATIONS

PCT Search Report for International Application No. PCT/IL2021/050236, mailed May 11, 2021, 3 pp.
(Continued)

*Primary Examiner* — Md M Rahman
(74) *Attorney, Agent, or Firm* — The Roy Gross Law Firm, LLC; Roy Gross

(57) ABSTRACT

The present disclosure discloses a method for evaluating the nutritional status in plants, using visible-to-shortwave (VIS-SWIR) infrared reflectance spectroscopy of carbohydrates, particularly in almond trees. The method comprises obtaining a dry plant sample (i.e. leaves, branches and roots), digesting and grinding it to a powder, capturing predetermined spectral data of the ground plant sample, correlating said spectral data to predetermined materials and evaluating said nitrogen status of said plants according to predetermined multivariate statistical models. The data obtained from this method facilitates crop management and fertilization by providing the nitrogen status of the plants based on non-structural carbohydrates.

14 Claims, 12 Drawing Sheets

(51) Int. Cl.
G01N 1/40 (2006.01)
G01N 21/31 (2006.01)
G01N 21/84 (2006.01)

(52) U.S. Cl.
CPC .............. G01N 2021/3155 (2013.01); G01N 2021/8466 (2013.01); G01N 2201/129 (2013.01)

(58) Field of Classification Search
USPC ..................................................... 356/437
See application file for complete search history.

(56) References Cited

U.S. PATENT DOCUMENTS

| | | | | |
|---|---|---|---|---|
| 2011/0161265 | A1* | 6/2011 | Gustafsson | G16B 20/00 506/8 |
| 2019/0000091 | A1* | 1/2019 | Shinde | A01H 5/10 |
| 2022/0390362 | A1* | 12/2022 | Liran | G06N 20/00 |

FOREIGN PATENT DOCUMENTS

| | | | |
|---|---|---|---|
| CN | 102072884 | A | 5/2011 |
| CN | 106770019 | A | 5/2017 |
| CN | 107421911 | A | 12/2017 |
| EP | 3090239 | A2 | 1/2018 |
| JP | 2009014700 | A | 1/2009 |

OTHER PUBLICATIONS

PCT Written Opinion for International Application No. PCT/IL2021/050236, mailed May 11, 2021, 6 pp.
Kokaly R. F.,"Investigating a Physical Basis for Spectroscopic Estimates of Leaf Nitrogen Concentration" ; vol. 75, Issue 2, Feb. 2001, pp. 153-161., Feb. 28, 2001 (Feb. 28, 2001) abstract, p. 154-155, 160.
Kokaly RF, Clark RN., "Spectroscopic determination of leaf biochemistry using band-depth analysis of absorption features and stepwise multiple linear regression." Remote Sens Environ. 1999;67(3):267-287., Mar. 31, 1999 (Mar. 31, 1999) abstract, p. 270, 286.
Li, Dong et al., "Estimation of area- and mass-based leaf nitrogen contents of wheat and rice crops from water-removed spectra using continuous wavelet analysis." Plant methods vol. 14 76. Aug. 29, 2018., Aug. 29, 2018 (Aug. 29, 2018) whole document.
"A review of methods for seneing the nitrogen status in plants: advantage, disadvantage and recent advances", Sensors, vol. 13, pp. 10823-10843 , Aug. 16, 2013. Nunoz R. F. Et- Al., Aug. 16, 2013 (Aug. 16, 2013). whole document.
I. Herrmann, A. Karnieli, D. J. Bonfil, Y. Cohen, and V. Alchanatis. "SWIR-based spectral indices for assessing nitrogen content in potato fields." Int. J. Remote Sens. 31, 19 (Oct. 10, 2010), 5127-5143. Oct. 10, 201 (Oct. 10, 2010) whole document.
Albornoz, Francisco, "Crop responses to nitrogen overfertilization": Scientia Horticulturae vol. 205, Jun. 23, 2016, pp. 79-83, downloaded on Nov. 3, 2022, (https://doi.org/10.1016/j.scienta.2016.04.026), 3 pp.
Chaves, M.M., "Effects of Water Deficits on Carbon Assimilation", Journal of Experimental Botany, vol. 42, Issue 1, Jan. 1991, pp. 1-16, downloaded on Nov. 3, 2022 (https://doi.org/10.1093/jxb/42.1.1), 3 pp.
Earles, J. Mason, et al., "Extreme mid-winter drought weakens tree hydraulic-carbohydrate systems and slows growth", New Phytologist (2018) 219: 89-97, doi: 10.1111/nph.15136.
Guignard, Cedric, et al., "Analysis of carbohydrates in plants by high-performance anion-exchange chromatography coupled with electrospray mass spectrometry", Journal of Chromatography A, 1085 (2005) 137-142, doi:10.1016/j.chroma.2005.05.068.
Landhausser, Simon M. et al., "Standardized protocols and procedurescan precisely and accurately quantifynon-structural carbohydrates", Tree Physiology, vol. 38, Issue 12, Dec. 2018, pp. 1764-1778, Published Oct. 30, 2018, downloaded Nov. 3, 2022 (https://doi.org/10.1093/treephys/tpy118), 40 pp.
Lassaletta, Luis, et al., "50 year trends in nitrogen use efficiency of world cropping systems: the relationship between yield and nitrogen input to cropland", Environ. Res. Lett. 9 (2014) 105011 (9pp), Published Oct. 27, 2014.
Rubio-Covarrubias, Oswaldo A., et al., "Evaluating foliar nitrogen compounds as indicators of nitrogen status in *Prunus persica* trees", Scientia Horticulturae 120 (2009) 27-33, http://dx.doi.org/10.1016/j.scienta.2008.09.007.
Ramirez, Jorge A., et al., "Near-infrared spectroscopy (NIRS) predicts nonstructural carbohydrate concentrations in different tissue types of a broad range of tree species", Methods in Ecology and Evolution 2015, 6, 1018-1025, British Ecological Society, doi: 10.1111/2041-210X.12391.
Rozenstein, Offer, et al., "Comparing the Effect of Preprocessing Transformations on Methods of Land-Use Classification Derived From Spectral Soil Measurements", IEEE Journal of Selected Topics in Applied Earth Observations and Remote Sensing, vol. 8, No. 6, Jun. 2015, 2393-2404.
Sperling, Or, "Excessive nitrogen impairs hydraulics, limits photosynthesis, and alters the metabolic composition of almond trees", ScienceDirect, Plant Physiology and Biochemistry, vol. 143, Oct. 2019, pp. 265-274, downloaded on Nov. 3, 2022 (https://www.sciencedirect.com/science/article/abs/pii/S0981942819303365), 7 pp., https://doi.org/10.1016/j.plaphy.2019.08.030.
Thornley, J.H.M., "A Balanced Quantitative Model for Root: Shoot Ratios in Vegetative Plants", Annals of Botany, vol. 36, Issue 2, Mar. 1972, pp. 431-441, Oxford Academic, Published Mar. 1, 1972, downloaded on Nov. 3, 2022 (https://academic.oup.com/aob/article-abstract/36/2/431/191060), https://doi.org/10.1093/oxfordjournals.aob.a084602.
Wold, Svante et al., "PLS-regression: a basic tool of chemometrics", Chemometrics and Intelligent Laboratory Systems 58 (2001), 109-130, Elsevier Science B.V. 2001, 23 pp.
Rotbart, N. et al. (2013). Estimating olive leaf nitrogen concentration using visible and near-infrared spectral reflectance. Biosystems Engineering, vol. 114, Issue 4, pp. 426-434, https://doi.org/10.1016/j.biosystemseng.2012.09.005.
Kokaly, Raymond F. (2001). Investigating a Physical Basis for Spectroscopic Estimates of Leaf Nitrogen Concentration. Remote Sensing of Environment, vol. 75, Issue 2, pp. 153-161, https://doi.org/10.1016/S0034-4257(00)00163-2.
Lassaletta, L. et al. (2014). 50 year trends in nitrogen use efficiency of world cropping systems: The relationship between yield and nitrogen input to cropland. Environmental Research Letters. 105011. 105011. 10.1088/1748-9326/9/10/105011.
European Patent Office, Extended European Search Report for European Patent Application No. 21 76 5532, dated May 11, 2023, 7pp.
Yao Xia, Tang Shou-Peng, Cao Wei-Xing, Tian Yong-Chao, Zhu Yan. Estimating the nitrogen content in wheat leaves by near-infrared reflectance spectroscopy[J]. Chin J Plant Ecol, 2011, 35(8): 844-852. DOI: 10.3724/SP.J.1258.2011.00844.
The State Intellectual Property Office of People's Republic of China, The First Office Action for Chinese Patent Application No. 202180031035.X, dated Apr. 1, 2025, 13pp.
Hu YG, Li PP, Mu JH, Mao HP, Wu CC, Chen B. Determination of total nitrogen content in fresh tea leaf using visible-near infrared spectroscopy. Guang Pu Xue Yu Guang Pu Fen Xi. Dec. 2008;28(12):2821-5. Chinese . PMID: 19248491. (English Abstract).

* cited by examiner

METHOD FOR ASSESSING NITROGEN NUTRITIONAL STATUS IN PLANTS BY VISIBLE-TO-SHORTWAVE INFRARED REFLECTANCE SPECTROSCOPY OF CARBOHYDRATES

CROSS REFERENCE TO RELATED APPLICATIONS

This application is a National Phase of PCT Patent Application No. PCT/IL2021/050236, having International filing date of Mar. 1, 2021, which claims the benefit of priority of U.S. Provisional Patent Application No. 62/983,677, filed Mar. 1, 2020, the contents of which are all incorporated herein by reference in their entirety.

FIELD OF THE INVENTION

The present disclosure relates to a method for evaluating the nutritional status in plants, using visible-to-shortwave (VIS-SWIR) infrared reflectance spectroscopy of carbohydrates, particularly in almond trees. The scientific fields related to the invention are, thus, plant sciences (particularly, plant nutrition and physiology) and spectroscopy.

BACKGROUND OF THE INVENTION

Modern farming requires that farmers fertilize crops according to their uptake capacity and nutritional requirements. This way, crops would reach a high nutrient efficiency that ensures a profitable use of resources and minimizes runoff to the environment (see "Crop Responses to Nitrogen Overfertilization: A Review", Albornoz F. *Scientia Horticulturae* 205:79-83, 2016). Nevertheless, farmers struggle to optimize fertilization because they lack physiological indicators for plant nutrition. Moreover, as most fertilization approaches were developed to mitigate nutritional deficiencies, there are very few established indicators for over-fertilization (see "Evaluating Foliar Nitrogen Compounds as Indicators of Nitrogen Status in *Prunus Persica* Trees", Rubio-Covarrubias et al. *Scientia Horticulturae* 120 (1): 27-33, 2009). The commonly used leaf analysis, for instance, will not suffice because leaves will not accumulate more than 30 mg $g^{-1}$ dry weight (DW) of nitrogen (N) or potassium (K), or over 10 mg g–1 DW of phosphorus (P), even if they are exposed to extremely high mineral concentrations. Hence, up to 50% of the current application of synthetic fertilizers will not translate to improved yields. Thus, the existing application of synthetic fertilizers will not translate to improved yields (see "50 Year Trends in Nitrogen Use Efficiency of World Cropping Systems: The Relationship between Yield and Nitrogen Input to Cropland", Lassaletta et al., *Environmental Research Letters* 9 (10): 105011, 2014). For this reason, among others, N fertilization is associated with large scale contamination of air, soil, and water resources. Excessive N fertilization could also interfere with crop productivity, eventually limiting further mineral uptake, and also intensify contaminating runoffs. While such visual indicators for overuse are helpful in some crops, they remain highly species-specific (see "Excessive Nitrogen Impairs Hydraulics, Limits Photosynthesis, and Alters the Metabolic Composition of Almond Trees", Sperling et al., *Plant Physiology and Biochemistry* 143:265-74, 2019).

Carbohydrates could indicate plants' nutritional status because mineral availability determines the allocation and composition of photosynthetic products. Trees allocate non-structural carbohydrates (NSC) to regulate plants' metabolism during growth and after stress conditions. Generally, soluble carbohydrates (SC) and immobile starch provide a useful biochemical insight into plants' physiological status. For instance, drought-stressed trees minimize photosynthesis and deplete starch reserves to sustain metabolism (see "Extreme Mid-Winter Drought Weakens Tree Hydraulic-Carbohydrate Systems and Slows Growth", Earles et al., *New Phytologist* 219(1): 89-97, 2018), while salinity-stressed plants increase SC in their roots to adjust osmotic potential (see "Effects of Water Deficits on Carbon Assimilation", Chaves, *Journal of experimental Botany* 42 (1): 1-16, 1991). Specifically, mineral availability affects plants' NSC status through glycolysis and tricarboxylic acid (TCA) pathways, and mineral transport is often coupled with sugar allocation. Hence, N-deficient plants, which recycle nitrogen from the canopy to support roots, also mobilize NSC (see "A Balanced Quantitative Model for Root: Shoot Ratios in Vegetative Plants", Thornley, *Annals of Botany* 36 (2): 431-41 1972). Current methods to detect NSC compositions in plants are often cumbersome and expensive, which limits their application to scientific studies. Chromatographic methods (liquid, gas, or ions), for instance, which can separate reductive sugars and starch, are expensive and would not quantify the total amount of NSC in the sample (see "Analysis of Carbohydrates in Plants by High-Performance Anion-Exchange Chromatography Coupled with Electrospray Mass Spectrometry", Guignard et al., *Journal of Chromatography A* 1085 (1): 137-42, 2005). The older enzymatic methods do quantify total free low molecular sugars (mainly glucose, fructose, and sucrose) and starch by spectrophotometry, but they tend to overlook sugar alcohols and raffinose. While the operational expenses of such traditional methods are markedly lower, they still require highly trained personnel and expensive machinery. In addition, results obtained from different photometric methods are considered controversial (see "Standardized Protocols and Procedures Can Precisely and Accurately Quantify Non-Structural Carbohydrates", Landhausser et al., *Tree physiology* 38 (12): 1764-78, 2018). Therefore, translating the scientific knowledge concerning NSC metabolism in plants to field applications requires a new detection method of NSC concentration in different plant tissues.

The applications of reflectance spectroscopy (RS) can assess various aspects of plant biochemistry, which is inexpensively and straightforwardly conducted to rapidly detect light reflectance that resonates with plants' physiological status. RS is based on hyperspectral data with hundreds of spectral narrow-bands, including the spectral regions of the visible (VIS), near-infrared (NIR), and shortwave infrared (SWIR), ranging from 400-2500 nm. RS techniques allow the analysis of a large number of samples by measuring light at a specific wavelength for identifying different molecular bonds (i.e., overtone bands), mainly chemical bonds of nitrogen, carbon, or oxygen to hydrogen (N—H, C—H, and O—H), which are the major organic components of plant tissues. To date, spectroscopy-based NSC analysis has usually been limited to several plant species and mainly to leaves. Nevertheless, modern computing capacities should enable assessing plants' nutritional status by RS, thus greatly advancing precise farming applications.

EP U.S. Pat. No. 3,090,239A4 discloses a hand-held spectrometer configured to illuminate an object and measure one or more spectra signals. The spectral data of the object can be used to determine one or more attributes of the chemical concentration. In many embodiments, one of the processors or a processor of the spectral data based on the spectral signal comprising instructions to determine an unpicked plant's fertilization status. This is a non-destructive measurement of a near-infrared spectrum of the unpicked plant or soil near the plant in response to a spectral signature of one or more of nitrogen, phosphate, or potassium.

Pinghai Ding et al. used Near-infrared reflectance spectroscopy to determine the chemical composition of fruit and nut trees. Potted almond and bench-grafted Fuji/M26 trees were fertigated during the growing season with different nitrogen levels by modifying the Hoagland solution to create different levels of nitrogen and carbohydrates in plant tissues during dormancy. A dried, ground and sieved leaves, branches, and root samples were uniformly packed into Field Spec® Pro spectrometer (Analytical Spectral Device, Malvern Panalytical Technologies, Boulder, CO, USA) that measured the spectral region of VIS-NIR-SWIR (i.e., 350-2500 nm) with 2151 channels (i.e., 350-2500 nm range at a 1 nm resolution) and 25° field of view was used. Statistical and multiple linear regression methods were used to derive a standard error of performance, and the correlation between NIR spectral reading and standard chemical composition analysis was determined, including for total nitrogen, amino acid, and nonstructural carbohydrate. (see "363 Near-infrared Reflectance Spectroscopy for the Determination of Total Nitrogen, Amino Acid, and Nonstructural Carbohydrates in Apple and Almond Samples", HortScience: a publication of the American Society for Horticultural Science 35(3), 2000).

In light of the above, there is still an unmet long-felt need for new indicators for assessing nitrogen nutritional status in trees in a cost-effective fashion, resulting in more accurate fertilization and ensuring that future farming is both profitable and sustainable.

BRIEF DESCRIPTION OF THE FIGURES

The accompanying drawings, which are included to provide a further understanding of the invention and are incorporated in and constitute a part of this specification, illustrate embodiments of the invention and, together with the description, serve to explain the principles of the invention.

SUMMARY OF THE INVENTION

Figure 1:
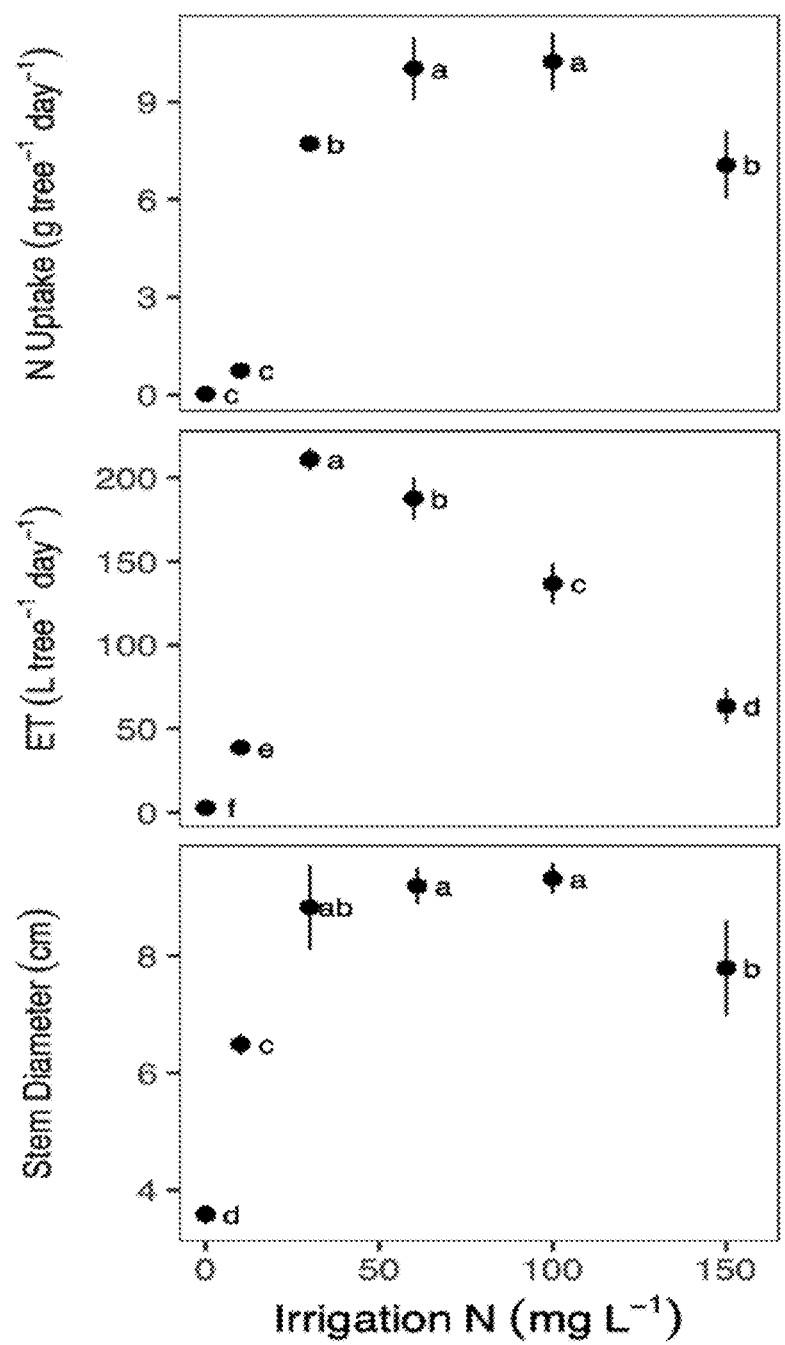
FIG. 1 graphically depicts the effects of nitrogen (N) concentration gradient (mg $L^{-1}$) on almond trees' whole-tree physiology.

It is one object of the present invention to disclose a method for assessing nitrogen status in a plant comprising steps of:
   a. obtaining a sample from different plant tissues parts (roots, branches, and leaves);
   b. drying, digesting, and grinding the plant tissues and parts thereof to a powder;
   c. capturing predetermined spectral data of the dried, powdered, and digested plant tissues;
   d. correlating the spectral data to predetermined materials; and
   e. evaluating the plants' nitrogen status according to predetermined multivariate statistical models to predict plant nutritional values.

It is another object of the present invention to disclose the method as defined above, wherein the plant is a tree selected from the group consisting of Magnoliophyta, Eudicotidae, Liliopsida, Magnolianae, Pinophyte, Ginkgophyte, Cycadophyte, and any combination thereof.

It is another object of the present invention to disclose the method as defined above, wherein the tree is a fruit tree.

It is another object of the present invention to disclose the method as defined above, wherein the tree is an almond tree.

It is another object of the present invention to disclose the method as defined above, wherein the tissues and parts are selected from the group consisting of roots, stems, branches, leaves, fruits, seeds, flowers, inflorescences, and any combination thereof.

It is another object of the present invention to disclose the method as defined above, further comprising a step of treating the plant with fertilizers.

It is another object of the present invention to disclose the method as defined above, wherein the fertilizers comprise nitrogen.

It is another object of the present invention to disclose the method as defined above, wherein the capturing of the predetermined spectral data is carried out using reflectance spectroscopy based on a spectrometer.

It is another object of the present invention to disclose the method as defined above, wherein the spectrometer captures the predetermined spectral data in the visible, near-infrared, and shortwave infrared spectral regions.

It is another object of the present invention to disclose the method as defined above, wherein the predetermined spectral data are reflectance signals at the 400-2,500 nm spectral range.

It is another object of the present invention to disclose the method as defined above, wherein the multivariate statistical models are selected from a group consisting of partial least squares-regression, partial least squares discriminant analysis.

It is another object of the present invention to disclose the method as defined above, wherein predicting the partial least squares-regression is evaluated by statistical parameters selected from a group consisting of a number of latent variables, root mean square error of calibration and cross-validation, coefficient of determination values of the relation between the predicted and observed samples and any combination thereof.

It is another object of the present invention to disclose the method as defined above, wherein the predetermined materials are selected from the group consisting of non-structural carbohydrates, soluble carbohydrates, starch, nitrogen, potassium, phosphorus, and any combination thereof.

It is another object of the present invention to disclose the method as defined above, further comprising a step of applying a computer-implemented non-transitory software on the predetermined spectral data.

It is another object of the present invention to disclose the method as defined above, wherein the computer-implemented non-transitory software is selected from a group consisting of PLS toolbox in Matlab environment, R, python and any combination thereof.

It is another object of the present invention to disclose the method as defined above, further comprising a step of conducting pre-processing transformations on the predetermined spectral data.

It is another object of the present invention to disclose the method as defined above, wherein the pre-processing transformations are selected from the group consisting of generalized least squares weighting, auto-scaling, Savitzky Golay algorithm, second derivatives, multiplicative signal correction, and any combination thereof.

A DETAILED DESCRIPTION OF PREFERRED EMBODIMENTS

Reflectance spectroscopy (RS) grants the ability to assess various aspects of plant biochemistry in relatively inexpensive, straightforward, and cost-effective techniques. RS is based on hyperspectral data with a hundred spectral bands, including the spectral regions of the visible (VIS), near-infrared (NIR), and shortwave infrared (SWIR), ranging from 400-2500 nm. RS is an advantageous method and high-throughput technique for the rapid detection of light reflectance that resonates with plants' physiological status. RS techniques allow the analysis of a large number of samples by measuring light at a specific wavelength for identifying different molecular chemical bonds mainly related to nitrogen, carbon, or oxygen to hydrogen (C—H, N—H, and O—H) bonds, which are the major organic components of plant tissues. RS is influenced by the combination of overtones related to minerals and organic companies in the plant tissues that related to their electronic transitions. The molecular mechanisms of electromagnetic radiation in RS involve excisions of non-fundamental vibration, overtones, and combination modes, which affect the prediction ability of non-structural carbohydrates (NSC). So far, RS has been a well-established method for indirect quantifications of nitrogen, phosphorus, and carbon in plant tissues. An additional advantage of RS is the estimation of various parameters, such as nitrogen, cellulose, and lignin, complimentary with biochemical analysis to calibrate their relations. However, presumably, accurate NSC prediction in plant tissues requires a combination of multiple spectral features and much higher spectral resolution, mainly in the SWIR spectral region. The spectral band that is known to be especially sensitive to starch, soluble carbohydrates (SC), and pectin concentrations is located primarily in the SWIR spectral region (e.g., 1450, 1490, 1510-1580, 1780, 1900, 1960, and 2070-2100 nm). The main complexity of applying RS is interpolating such wide range spectral signals and identifying the most relevant spectral wavelengths. Therefore, multivariable statistical methods are required to reduce data dimensionality and associate only the most essential spectral signals to targeted chemical combinations that would improve NSC quantification and to evaluate plant nutritional status. However, spectroscopy-based NSC analysis has been usually limited to several plant species and specific plant tissue, mainly to leaf tissues. Nevertheless, the modern computing capacities should extend the ability to assess plants' nutritional status by advancing precise farming applications. Hence, the present application aims to harness said computing capacities and multivariate statistical approaches to characterize nitrogen nutrition in the VIS-NIR-SWIR spectral region in different plant tissues (such as roots, leaves and branches) and nutritional status (mainly sugars and carbohydrates). The data obtained by the method of the present application is primarily meant to facilitate management of crop irrigation and fertilization.

As used herein after, the term "about" refers to any value being up to 25% lower or greater the defined measure.

As used herein after, the capitalized letter "N" refers to nitrogen.

As used herein after, the capitalized letter "K" refers to potassium.

As used herein after, the capitalized letter "P" refers to phosphorus.

As used herein after, the term "non-structural carbohydrates (NSC)" refers mainly to sugars (in the form of monosaccharides, disaccharides, oligosaccharides, or polysaccharides) and starch which fulfil distinct functional roles in plants, including transport, energy metabolism and osmoregulation, and provide substrates for the synthesis of different compounds in the plant.

As used herein after, the term "total non-structural carbohydrates (TNC)" refers to the sum of total glucose, free fructose and free sucrose in a plant tissue.

As used herein after, the term "soluble carbohydrates (SC)" refers to carbohydrates which are soluble in water. SC are one of the most fundamental metabolic pool in plants. SC are a universal component of most living organisms and a fundamental building block in biosynthetic processes. The qualitative and quantitative changes in carbohydrates often accompany plant's responses to stress. Carbohydrates in plant can be classified into three general groups: soluble, storage, and structural carbohydrates. SC are soluble in water and can be found in most cellular compartments.

As used herein after, the term "reflectance spectroscopy (RS)" refers to a spectroscopic technique based on near-infrared reflectance spectroscopy. This technique uses the electromagnetic spectrum region of 350-2500 nm for physiological diagnostics application.

As used herein after, the term "crop" refers to any type of plant, either a monocot or a dicot plant, an annual, biennial or a perennial plant. The crop can be for instance an agricultural crop, such as tomato or pepper, an ornamental crop or a tree.

The present application discloses a method for assessing nitrogen status in trees, comprising steps of: (i) fertilizing plants with nitrogen at varying concentrations; (ii) reading nitrogen-treated, dried, and ground plant tissues using reflectance spectroscopy (RS); (iii) linking between the spectral reflectance signals and data to nitrogen nutrition and carbohydrate concentrations of said plant tissues, including the powder form of leaves, branches, and roots; and (iv) parameterizing an RS model, by applying multivariate statistical approaches (partial least square regression and discriminant analysis) to characterize nitrogen nutrition in the VIS-NIR-SWIR spectral region in different plant tissues and nutritional status.

The present invention relates, in a non-limiting way, to almond trees, which are cultivated by intensive irrigation and fertilization applications. These conditions expose the surrounding habitats to contamination from leakage and runoffs and stipulate the sustainability of almond production on precise nutrients applications. Nonetheless, the present invention can be applied to various types of trees and plants.

Example 1

In order to establish the method of the present invention, 24 almond saplings were planted in 1 cubic meter lysimeters filled with inert soil-less media throughout April 2016 at the Gilat Research Center, Israel. Since April 2017, the trees were irrigated with the necessary microelements, 10 mg of $P\ L^{-1}$, 60 mg of $K\ L^{-1}$, and 0, 10, 30, 60, 100, or 150 mg of $N\ L^{-1}$ (4 trees per treatment). The irrigation amounts were set by potential evapotranspiration (ETp) and maintained a 0.3 leaching to ensure the roots zone's adequate flushing. Further information concerning the experimental setup is available at Sperling et al. ("Excessive Nitrogen Impairs Hydraulics, Limits Photosynthesis, and Alters the Metabolic Composition of Almond Trees", *Plant Physiology and Biochemistry* 143:265-74, 20192019). From April to October 2017, diurnal irrigation (I) and drainage (D) quantities were recorded monthly for each lysimeter. Then, the irrigation N concentration [Ni] and drainage N concentration [Nd] were analyzed using a Gallery 152 Plus Automated Photometric Analyzer (Thermo Fischer Scientific Inc., MA, USA). Finally, daily evapotranspiration (ET) and N uptake (NU) were computed by Eq. 1 and 2).

$$ET = 1 - D \quad \text{Equation 1:}$$

$$N_U = [N_I] \cdot I - [N_D] \cdot D \quad \text{Equation 2:}$$

As depicted in FIG. 1, the effects of nitrogen gradient in the supplied irrigation on mineral uptake and physiological performances of almond trees are presented. Upper panel: changes in means (=SD) of N uptake (g $tree^{-1}\ day^{-1}$). Middle panel: changes in evapotranspiration (ET, L $tree^{-1}\ day^{-1}$). Lower panel: changes in branches diameter (cm). Letters denote the significance of differences in between means (one-way ANOVA and Tukey HSD). The nitrogen uptake was increased from ~0 to 10 g N $tree^{-1}\ day^{-1}$ with the increase in nitrogen supply from 0 to 60 mg $L^{-1}$, sustained around 10 g N $tree^{-1}\ day^{-1}$ uptake at 100 mg N $L^{-1}$, and then decreased to 7 g N $tree^{-1}\ day^{-1}$ at 150 mg N $L^{-1}$. The nitrogen gradient in the supplied irrigation also affected evapotranspiration (ET), which increased from 3 to 211 L $tree^{-1}\ day^{-1}$ as the nitrogen gradient in the supplied irrigation increased from 0 to 30 mg $L^{-1}$. Then, as irrigation nitrogen continued to increase, ET decreased to 188, 137, and 64 for 60, 100, and 150 mg N $L^{1-}$, respectively. Finally, nitrogen availability and water uptake affected the almond trees' growth. They only reached a 4 cm diameter in the 0 mg N $L^{-1}$ irrigation but attained a 6.5 and 9 cm stem diameter in the 10 and 30 mg N $L^{-1}$ treatment, respectively. Stem diameter remained ~9.3 cm in the 60 and 100 mg N $L^{-1}$ treatment and then reduced to 7.8 cm in the 150 mg N $L^{-1}$ treatment.

Symbols depicted in FIG. 1: dots—single measurements, horizontal lines—medians, lower hinge—25% quartile, upper hinge—75% quartile, and vertical lines—extensions to the farthest measurements within the interquartile spread. Letters denote significant changes in between means (one-way ANOVA and Tukey HSD).

Example 2

To investigate the effects of nitrogen concentrations in the irrigation water on almond trees' metabolic profile and nitrogen status, trees were grown and irrigated as described in Example 1. Plant tissues (leaves, branches, and roots) were collected on Sep. 1, 2018, dried, powdered, and digested with sulfuric acid and hydrogen peroxide. Then, the liquidized nitrogen was detected by an automated photometric analyzer (Thermo Scientific Gallery 152 Plus). Roots (25 cm deep and 5 mm in diameter), branches (5 cm of current year's growth), and leaves (fully developed young leaves) were sampled, flash-frozen in liquid nitrogen, lyophilized, and stored at −80° C. The dried samples were later ground to a fine powder using a ball grinder (MiniBeadbeater-96, Glen Mills Inc., NJ) and analyzed for non-structural carbohydrates (NSC) using updated enzymatic and colorimetric method. First, soluble carbohydrates (SC) were extracted by dissolving 25 mg of the tissue in 1 mL of deionized water (DI), shaking for 15 minutes at 72° C., centrifuging for 10 minutes at 17,000 g, and removing 50 μL of the supernatant. Then, starch was digested by incubating the tissue in 500 μL sodium acetate buffer (0.2 M, pH 5.6), 100 μL amylglucosidase (70 units $mL^{-1}$, Sigma-Aldrich), and 100 μl amylase (7 units $ml^{-1}$, Sigma-Aldrich) for 4 hours at 37° C. Another 50 μL supernatant was extracted, samples were diluted (X21), mixed in a 96 well plate with 150 μL sulfuric acid and anthrone solution (0.1%), incubated at 96° C. for 10 minutes, and cooled to 22° C. Finally, light absorbance at 620 nm was measured using a spectrophotometer (Multiskan, Thermo Fischer Scientific Inc., MA), and glucose equivalent SC and starch concentrations were determined.

Figure 2:
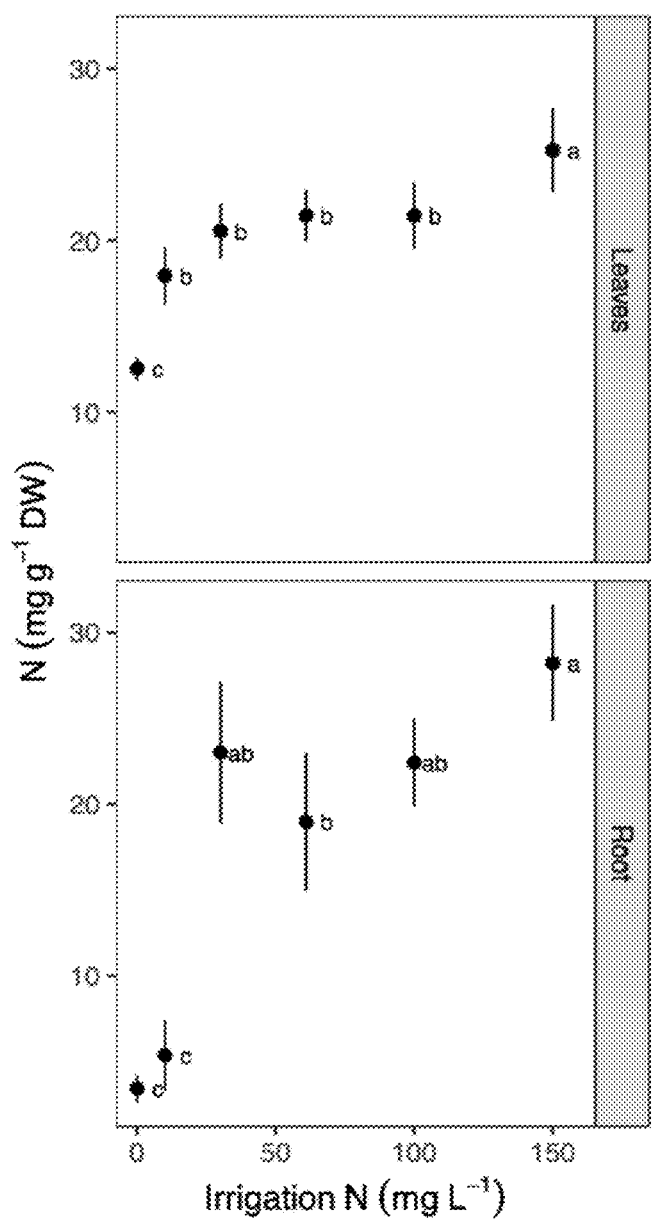
FIG. 2. graphically depicts the effects of nitrogen (N) concentration in irrigation (mg N $L^{-1}$) on the metabolic and N concentration of almond trees.
Figure 3A:
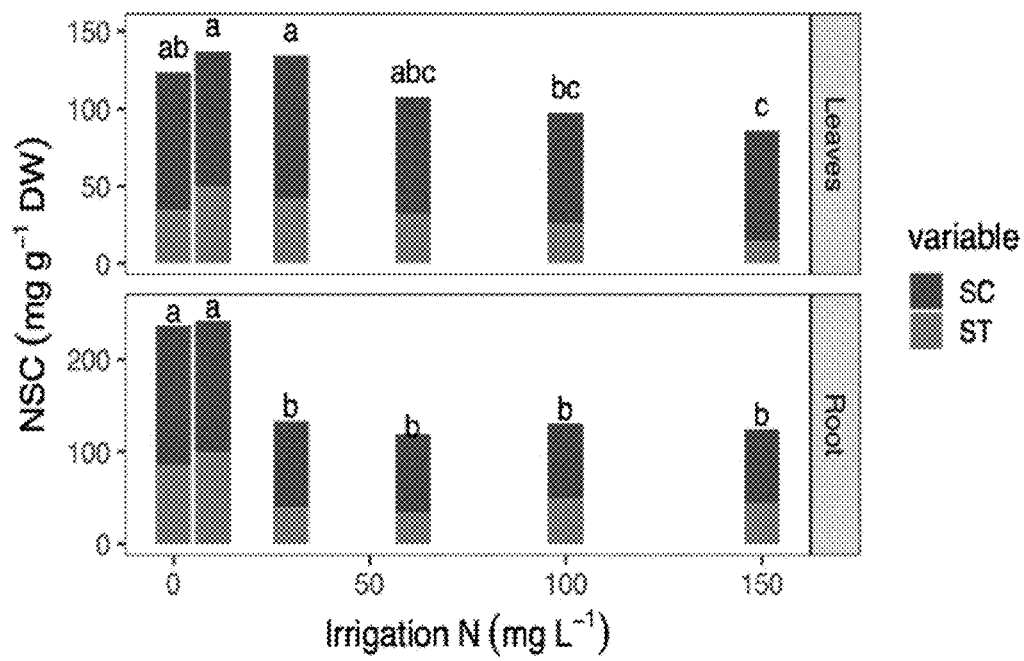
FIG. 3A. graphically depicts total non-soluble carbohydrates concentrations in roots and leaves as a function of nitrogen (N) concentration gradient in irrigation (mg $L^{-1}$)
Figure 3B:
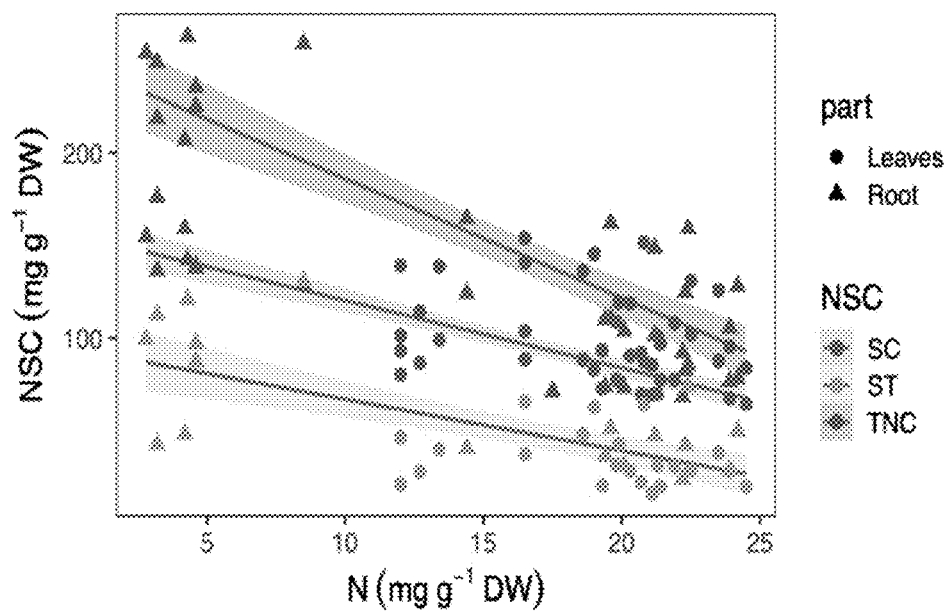
FIG. 3B graphically depicts total non-soluble carbohydrates concentrations in roots and leaves as a function of nitrogen (N) concentration gradient in irrigation (mg $L^{-1}$)

FIGS. 2-3 show the effects of nitrogen (N) concentration in irrigation (mg N $L^{-1}$) on the metabolic and N concentration of almond trees in September 2018. FIG. 2 graphically depicts the mean (±SD) N concentrations in leaves (upper panel) and roots (lower panel) for the 0 to 150 mg N L$^{-1}$ irrigation treatments. Letters denote significant changes in between means (one-way ANOVA and Tukey HSD). FIG. 3A depicts soluble carbohydrate concentrations (SC, dark grey columns), starch (ST, light grey columns), and total non-structural carbohydrates (TNC, the full columns) in leaves (upper panel) and roots (lower panel) for 0, 10, 30, 60, 100, and 150 mg N L$^{-1}$ irrigations. Lower-case letters denote significant changes in NSC concentrations between treatments (one-way ANOVA and Tukey HSD). FIG. 3B depicts the regressions between leaf (circles) and root (triangles) N concentrations to their SC (green symbols), ST (yellow), and TNC (black) concentrations. Lines denote the linear fit, and shades represent the 95% confidence intervals (df=39, P<0.05).

As depicted in FIG. 3A and FIG. 3B, within the leaves of those trees irrigated with 0, 10, or 30 mg N L$^{-1}$, total non-soluble carbohydrates (TNC) concentrations reached ~131 mg g$^{-1}$ DW, whereas they were only 112, 97, and 86 mg g$^{-1}$ DW of TNC in the 60, 100, and 150 mg N L$^{-1}$ irrigation groups, respectively (FIG. 3A). The majority of carbohydrates were SC, ranging between 72 mg g$^{-1}$ DW in the 100 and 150 mg N L$^{-1}$ treatments and 92 mg g$^{-1}$ DW in the 30 mg N L$^{-1}$ group. Starch concentrations ranged in the leaves between 14 mg g$^{-1}$ DW in the 150 mg N L$^{-1}$ irrigation treatment and 49 mg g$^{-1}$ DW in the 10 mg N L$^{-1}$ irrigation group. TNC levels in the roots peaked at the 0 and 10 mg N L$^{-1}$ irrigation treatment with ~239 mg g$^{-1}$ DW but then dropped abruptly to ~126 mg g$^{-1}$ DW in the 30, 60, 100, and 150 mg N L$^{-1}$ irrigation groups. SC peaked at ~147 mg g$^{-1}$ DW in the 0 and 10 mg N L$^{-1}$ irrigation treatments and was reduced to 80 mg g$^{-1}$ DW in the 150 mg N L$^{-1}$ irrigation. Finally, ST in the roots peaked at 99 mg g$^{-1}$ DW in the 0 and 10 mg N L$^{-1}$ irrigation treatments, reduced to 35 mg g$^{-1}$ DW in the 30 and 60 mg N L$^{-1}$ irrigation groups, and then increased again to 47 in the 100 and 150 mg N L$^{-1}$ irrigation treatments.

Leaf nitrogen concentration bottomed at 12 mg g$^{-1}$ DW in the 0 mg N L$^{-1}$ irrigation group, increased to ~20 mg g$^{-1}$ DW in the 10, 30, 60, and 100 mg N L$^{-1}$ irrigation treatments, and then finally increased to 25 mg g$^{-1}$ DW in the 150 mg N L$^{-1}$ irrigation group (as shown in the upper panel of FIG. 2). Root nitrogen concentrations were even more homogeneous, averaging at 5 mg g$^{-1}$ DW in the 0 and 10 mg N L$^{-1}$ irrigation groups and then stabilizing at 24 mg g$^{-1}$ DW in the rest of the treatments (as shown in the lower panel of FIG. 2). Accordingly, NSC concentrations correlated to the nitrogen concentrations in the almond trees' leaves and roots (FIG. 3A) by negative linear regressions (FIG. 3B). The regressions were always significant (p<0.05), and the steepest slope (−6.4 mg NSC mg$^{-1}$ N) and best fit (R$^2$=0.76) were found for TSC concentrations, versus a milder inclination (−2.7 mg TNC mg$^{-1}$ N) and weaker fit (R$^2$=0.43) in the case of starch. Overall, the majority of the samples had ~40 mg starch mg$^{-1}$ DW, 90 mg SC g$^{-1}$ DW, and 130 mg TNC g$^{-1}$ DW. Yet, samples with extremely low nitrogen (<5 mg g$^{-1}$ DW), which were always roots, had ~90, 150, and 220 mg g$^{-1}$ DW of starch, SC, and TNC, respectively.

Symbols presented in FIGS. 2-3: dots—single measurements, horizontal lines—medians, lower hinge—25% quartile, upper hinge—75% quartile, and vertical lines—extensions to the farthest measurements within the interquartile spread.

Example 3

Each tissue sample (as fine powder material) was placed into a 2 mL vial for RS analysis. Spectral data were obtained for each plant tissue sample using spectrometers placed at a 45° angle, with fixed light sources. A spectrometer (Analytical Spectral Device, CO, USA) with a spectral region of VIS-NIR-SWIR (i.e., 400-2500 nm) was used, equipped with a fiber optic contact probe in reflectance mode with fix light. A Field Spec® Pro spectrometer (Analytical Spectral Device, Malvern Panalytical Technologies, Boulder, CO, USA) that measured the spectral region of VIS-NIR-SWIR (i.e., 350-2500 nm) with 2151 channels (i.e., 350-2500 nm range at a 1 nm resolution) and 25° field of view was used. The spectrometer relied on three separate detectors—a silicon VIS-NIR detector (350-1000 nm) and two indium-gallium-arsenide (InGaAs) photodiode SWIR detectors (1001-1800 and 1801-2500 nm). The spectral acquisition was performed using the instrument's Indico™ Pro Spectral Acquisition software and was post-processed using the View-Spec-Pro software (Malvern Panalytical Technologies, Boulder, CO, USA). In order to standardize the energy flux reading into a reflectance (ρ) base, a commercial white reference panel (Spectralon Labsphere Inc., North Sutton, New Hampshire, USA) was used throughout the measurements. The spectral data included four spectral readings for each sample that later averaged to a final value representing the spectral sample. Averaging the spectral data was done to reduce spectral noise and overcome micro-topography and shadow effects. The spectrometer signal data was captured using the Indico™ Pro Spectral Acquisition Software (Analytical Spectral Device, CO, USA).

For developing a predictive model of carbohydrate concentrations, the reflectance values were calibrated against analytical lab-based NSCs (SC and starch) measurements by multivariate statistical regression and classification models. The inventors applied linear partial least square regression and discriminant analysis (PLS-R, and PLS-DA, respectively). PLS-R is an established and well-known statistical model for spectroscopy application that was used to predict NSC (see "PLS-Regression: A Basic Tool of Chemometrics", Wold, Sjöström, and Eriksson, *Chemometrics and Intelligent Laboratory Systems* 58:109-30, 2001). PLS-DA was applied to classify the different plant tissues (leaves, branches, and roots) and the irrigation nutritional treatments to test their effect on minerals and the metabolic composition of SC and starch. PLS-DA is a supervised multivariate classification method for spectral data, aiming to find the variability and direction in multivariate space that determine the known classes in the calibration dataset. This method makes it easier to understand, by graphical means, the spectral differences between categories (i.e., different plant tissues, irrigation nitrogen treatments) and also permits the statistical evaluation of whether the differences between the classes are significant. Before applying the PLS procedure, the dataset was randomly divided into two separate calibration and validation datasets using the Venetian blind cross-validation method, based on a 70 to 30 split ratio, respectively.

Figure 4:
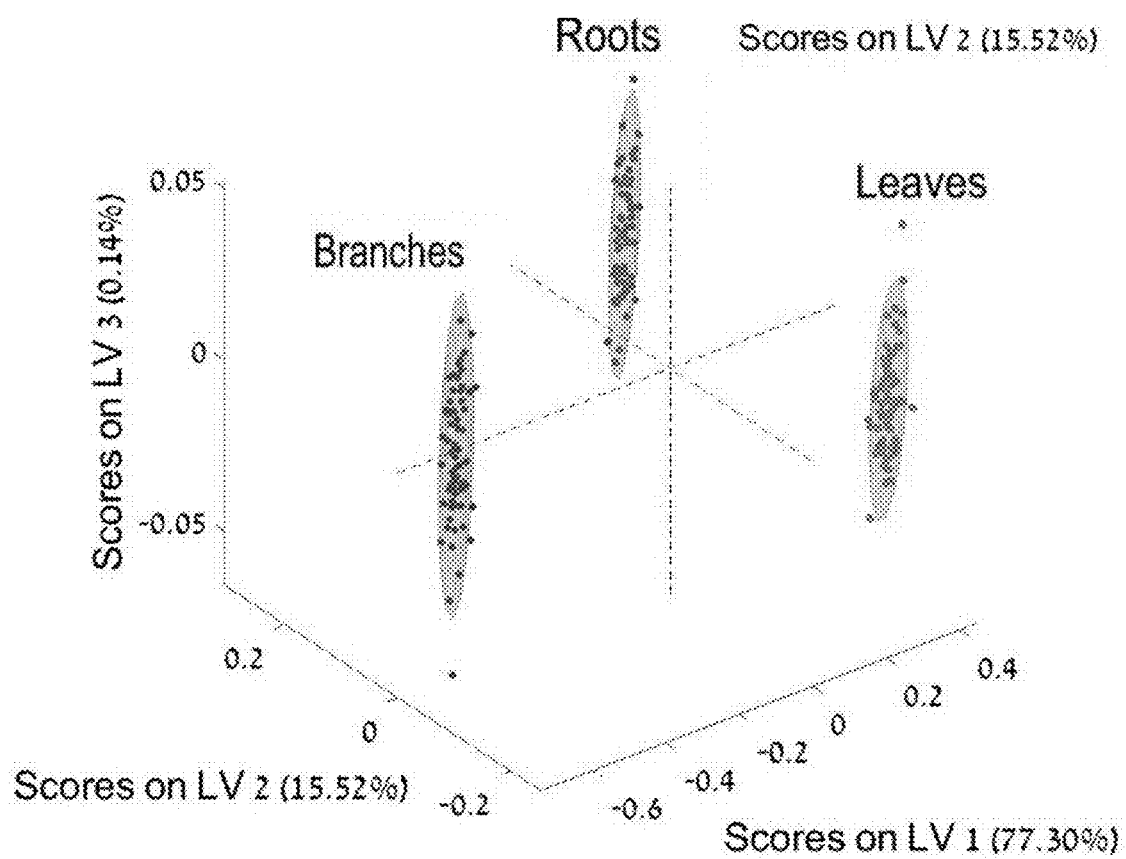
FIG. 4 depicts the partial least squares-discriminant analysis (PLS-DA)-based classification of the three plant tissues: branches, leaves, and roots.

In light of the description above, a PLS-DA analysis was performed to quantify the changes in the spectral signal between the different plant tissues and classify the effect of nitrogen gradient in the supplied irrigation water and on the metabolic and mineral composition of almond trees. The results of the PLS-DA classification of the three plant tissues (branches, leaves and roots) are depicted in FIG. 4. The classification results show high accuracy in the model that facilitated the discrimination between the three plant tissues with 100% accuracy.

Example 4

Figure 5A:
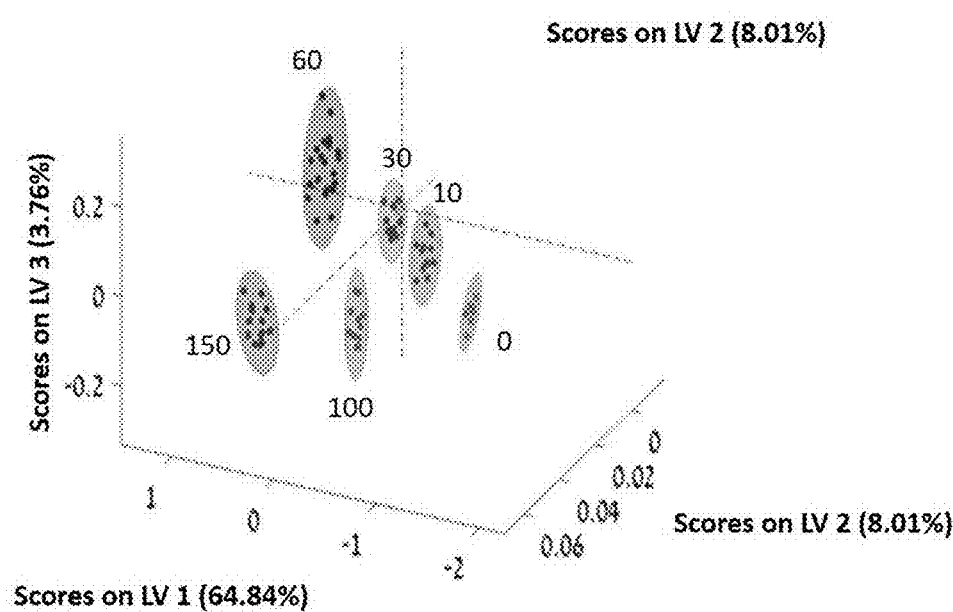
FIG. 5A depicts the partial least squares-discriminant analysis (PLS-DA) classification of nitrogen irrigation treatments for leaf tissues.
Figure 5B:
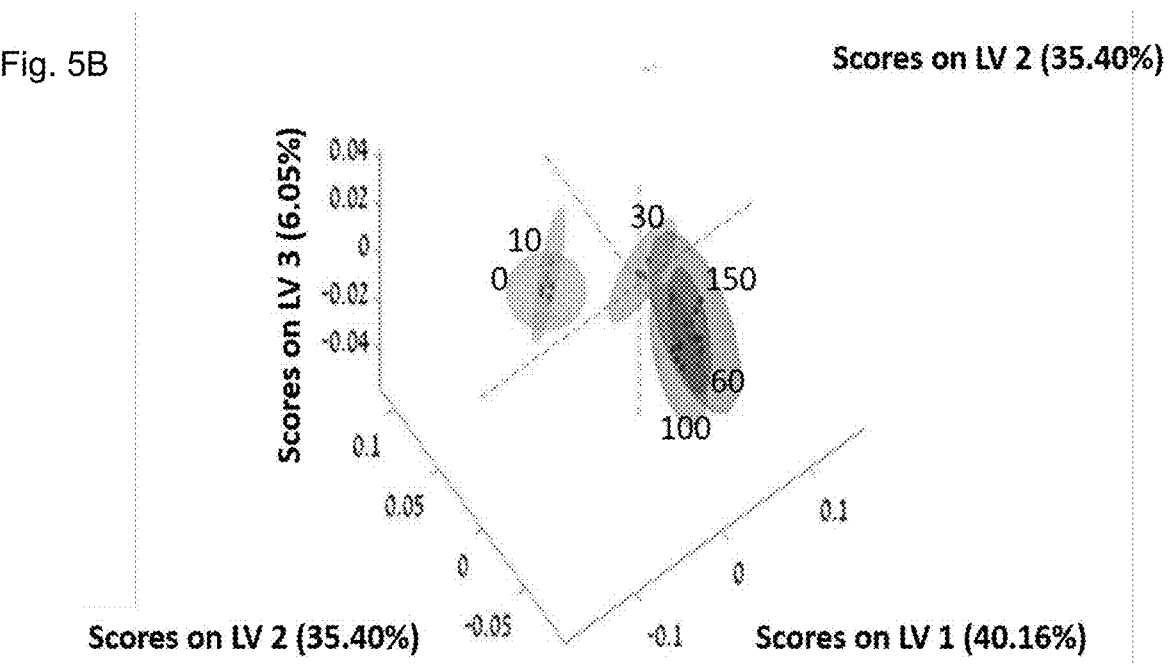
FIG. 5B depicts the partial least squares-discriminant analysis (PLS-DA) classification of nitrogen irrigation treatments for root tissues.

The effect of nitrogen gradient in the supplied irrigation water on the metabolic and nitrogen accumulation of almond trees in root and leaf tissues is demonstrated in FIGS. 5A-5B. The different nitrogen concentrations in irrigation (mg N $DW^{-1}$) presented in these figures are: 0, 10, 30, 60, 100 and 150 (mg N $DW^{-1}$), and their effects on almond trees' metabolic and nitrogen concentration and their separability in the classification are presented.

The PLS-DA (generated according to the description in example 3) for nitrogen gradient in the supplied irrigation in leaves (FIG. 5A) is with a 98% discrimination accuracy and with a Kappa coefficient of 0.95. The classes with an accuracy of 100% were the 0, 30, 60, and 150 mg N $L^{-1}$ irrigation treatments, while the accuracy of the 10 and 100 mg N $L^{-1}$ groups were 88.6 and 97.1%, respectively. The PLS-DA results for N gradient in the supplied irrigation for the root samples (FIG. 5B) showed an overall discrimination accuracy of 94% and a Kappa coefficient of 0.92. The classes accuracy was 96% for the 0 mg N $L^{-1}$ irrigation group, 92% for the 10 mg N $L^{-1}$ irrigation group, 92% for the 30 mg N $L^{-1}$ irrigation group, 84% for the 60 mg N $L^{-1}$ irrigation group, 96% for the 100 mg N $L^{-1}$ irrigation group and 100% for the 150 mg N $L^{-1}$ irrigation group.

Example 5

In addition to conducting a PLS-DA, a PLS-R (linear partial least square regression) was utilized to generate a predictive model of carbohydrate concentrations in almond trees. PLS-R is a well-known method, and it establishes a statistical model that is used to predict NSC (see "Near-infrared Spectroscopy (NIRS) Predicts Non-structural Carbohydrate Concentrations in Different Tissue Types of a Broad Range of Tree Species", Ramirez et al., *Methods in Ecology and Evolution* 6 (9): 1018-25, 2015). PLS-R selects factors to maximize the variation between predictor (spectral data as X-block) and response variables [laboratory carbohydrate concentrations as Y-block; (Paz-Kagan. et al. 2015)] and reduce data dimensionality.

Pre-processing transformations (PPTs) for classifications were used to decrease the variability within classes and increase the variability between classes, at the same time. PPT for the regression model is used for reducing noise and the variation in the dataset that cannot be managed by the modeling techniques. Several of the most frequently used PPTs in spectroscopy were selected, including auto-scaling, Savitzky Golay algorithm, second derivatives, multiplicative signal correction (MSC), and generalized least squares weighting (GLSW). Each PPT was tested separately and with different combinations. The selection of the PPTs was based on previous studies that had been found to be successful for spectroscopy applications (see "Comparing the Effect of pre-processing Transformations on Methods of Land-Use Classification Derived from Spectral Soil Measurements", Rozenstein et al., *IEEE Journal of Selected Topics in Applied Earth Observations and Remote Sensing* 8:2393-2404, 2015). The most accurate models were found to be the GLSW with and without autoscaling before the GLSW transformation. The prediction of the PLS-R was evaluated using several statistical parameters and included the number of latent variables (LVs), root means square error (RMSE) of calibration and cross-validation (RMSEC and RMSECV, respectively), as well as by the coefficient of determination ($R^2$) values of the relation between the predicted and observed samples. For the classification accuracy of the PLS-DA model, the total accuracy and the Kappa statistic were calculated. All the data processing was applied by PLS-Toolbox (Eigenvector Research Inc., WA, USA) running under a Matlab environment version 9.3 (The Mathworks Inc., MA, USA).

Figure 6A:
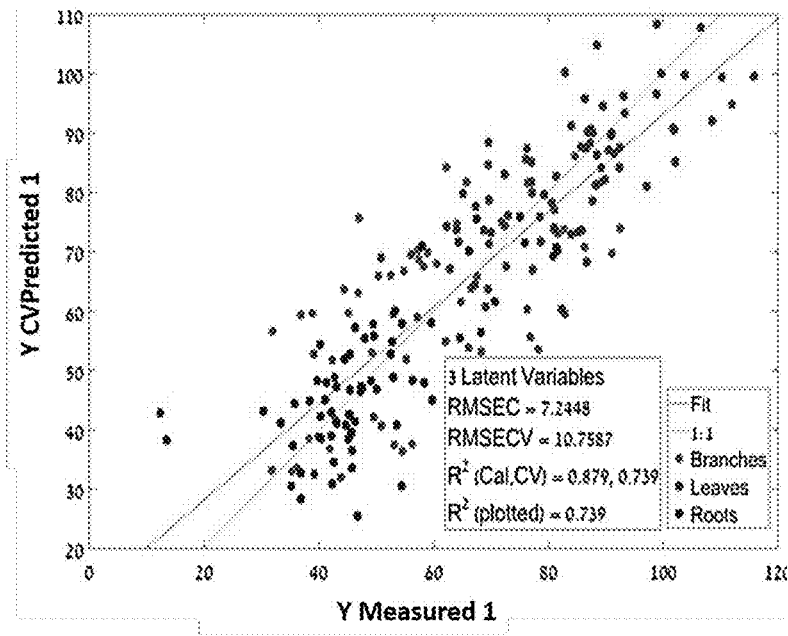
FIG. 6A depicts a scatterplot of partial least squares regression (PLSR) calibration and cross-validation curves, presenting the correlation between the spectral- and analytically-based measurements of soluble carbohydrates (SC) in branches, leaves, and roots of almond trees irrigated with varying nitrogen concentrations.
Figure 6B:
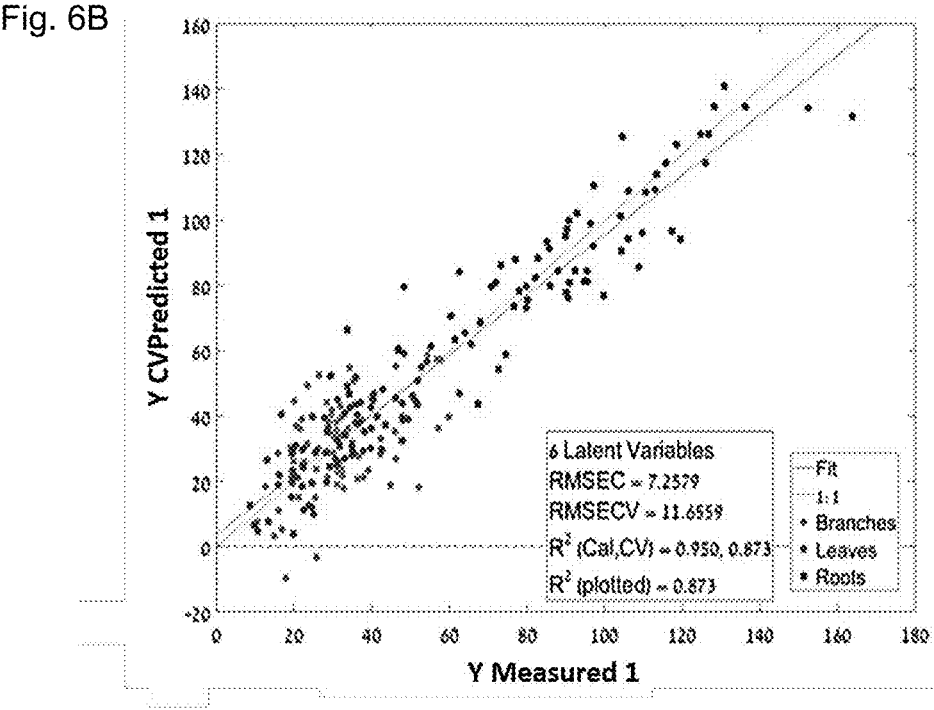
FIG. 6B depicts a scatterplot of partial least squares regression (PLSR) calibration and cross-validation curves, presenting the correlation between the spectral- and analytically-based measurements of starch in branches, leaves, and roots of almond trees irrigated with varying nitrogen concentrations.
Figure 7A:
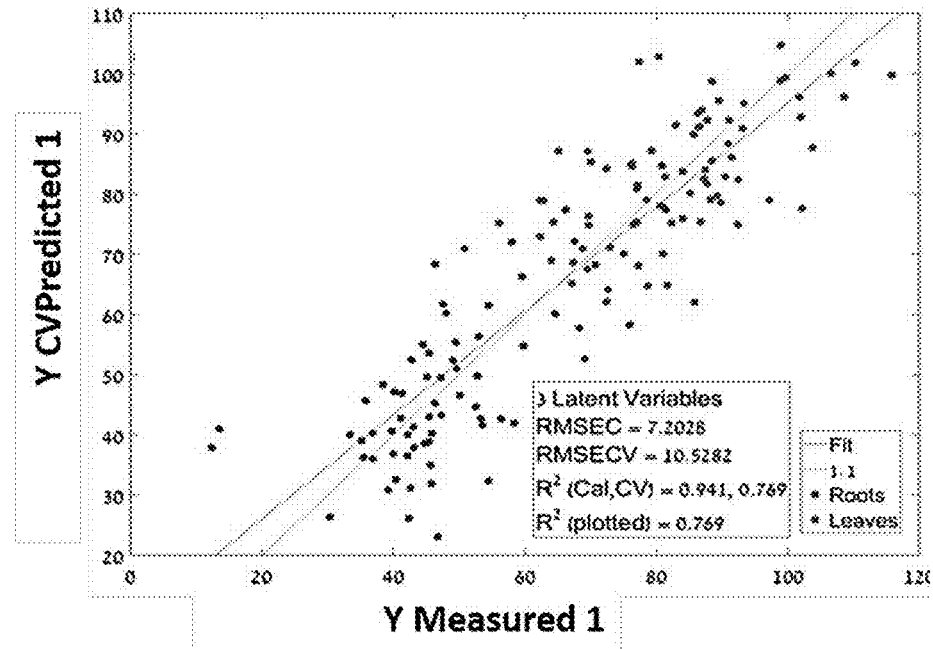
FIG. 7A depicts a scatterplot of partial least squares regression (PLSR) calibration and cross-validation curves, presenting the correlation between the spectral- and analytically-based measurements of soluble carbohydrates (SC) in leaves and roots of almond trees irrigated with varying nitrogen concentrations.
Figure 7B:
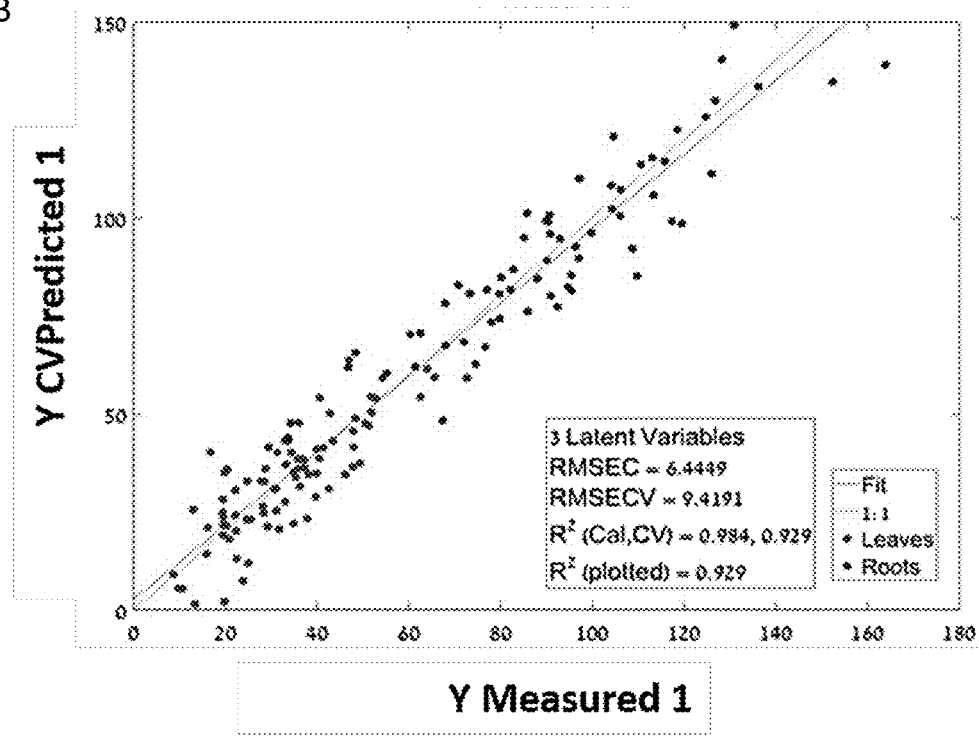
FIG. 7B depicts a scatterplot of partial least squares regression (PLSR) calibration and cross-validation curves, presenting the correlation between the spectral- and analytically-based measurements of starch in leaves and roots of almond trees irrigated with varying nitrogen concentrations.

The relevant essential wavelengths identified by the PLS-R analysis indicative of soluble carbohydrates and starch content are shown in Table 1. The statistical parameters included $R^2$, RMSEC, and RMSECV. In order to evaluate the relative importance of each wavelength in the different PLS-R models, the variable importance in projection (VIP) statistic was computed to reveal the wavelength importance scores of each explanatory variable. Since the average of squared VIP scores equals 1, those wavelengths with a VIP score greater than one are identified as important wavelengths. FIGS. 6-7 graphically depict the correlation between plant tissue spectroscopy and soluble carbohydrates and starch for cross-validation prediction. FIG. 6A graphically depicts a scatterplot of partial least squares regression (PLS-R) calibration and cross-validation curves, presenting the correlation between the spectral- and analytically-based measurements of soluble carbohydrates (SC) in branches, leaves, and roots of almond trees. FIG. 6B graphically depicts a scatterplot of PLS-R calibration and cross-validation curves, presenting the correlation between the spectral- and analytically-based measurements of starch in branches, leaves, and roots of almond trees. FIG. 7A graphically depicts a scatterplot of PLS-R calibration and cross-validation curves, presenting the correlation between the spectral- and analytically-based measurements of soluble carbohydrates in leaves and roots of almond trees. FIG. 7B graphically depicts a scatterplot of PLS-R calibration and cross-validation curves, presenting the correlation between the spectral- and analytically-based measurements of starch in leaves and roots of almond trees. The almond trees were irrigated with 0, 10, 30, 60, 100, or 150 mg N $L^{-1}$. The root means squared error of calibration and cross-validation (RMSEC and RMSECV, respectively) values refer to starch and SC g mg $g^{-1}$ DW.

When all three plant tissues were used in the PLS-R modeling process, the $R^2$ were 0.88 and 0.95 for the soluble carbohydrates and starch, respectively. However, omitting the branch tissues from the modeling process (i.e., leaving only the leaf and root plant tissues, FIGS. 7A-7B) revealed higher $R^2$ of 0.94 and 0.98 for the soluble carbohydrates starch, respectively.

TABLE 1

Accuracy assessment of the partial least squares - regression (PLS-R) models in terms of the spectral range indicative of soluble carbohydrates and starch.

| | LVs | Range | Mean | SD | R² | RMSEC | RMSECV | VIP (Spectral bands in nm) |
|---|---|---|---|---|---|---|---|---|
| Soluble carbohydrates (SC) | | | | | | | | |
| Branches | 3 | 88.01 | 63.22 | 21.07 | 0.65 | 13.74 | 16.79 | 430, 670 |
| Leaves | 4 | 91.96 | 83.42 | 14.39 | 0.71 | 7.25 | 7.91 | 525, 680, 1450, 1940 |
| Root | 3 | 68.97 | 48.32 | 13.03 | 0.72 | 7.81 | 8.16 | 550, 680, 1000, 1450, 1780, 1940, 2000, 2080, 2330 |
| All plant tissues | 4 | 130.41 | 66.39 | 21.94 | 0.88 | 9.68 | 10.76 | 443 680, 1450, 1770, 1809, 1950, 2050, 2250, 2330, 2375 |
| Leaves & Roots | 3 | 130.41 | 67.9 | 23.38 | 0.87 | 7.25 | 11.65 | 680, 100, 1450, 1800, 1900, 2050 |
| Starch | | | | | | | | |
| Branches | 5 | 49.25 | 31.97 | 11.38 | 0.82 | 5.23 | 8.87 | 425, 670, 1450, 1800, 1910, 1960, 2100, 2250-2370 |
| Leaves | 6 | 64.01 | 33.56 | 13.57 | 0.85 | 5.85 | 7.28 | 450, 670, 1000, 1450, 1580, 1900, 1960, 2250 |
| Root | 5 | 134.37 | 91.55 | 26.81 | 0.90 | 8.49 | 9.58 | 500, 1450, 1960, 2080, 2350 |
| All plant tissues | 4 | 155.156 | 50.42 | 32.41 | 0.95 | 7.59 | 11.65 | 430, 670, 1010, 1450, 1560, 2002 2080 2250, 2360 |
| Leaves & Roots | 3 | 155.156 | 59.21 | 32.4 | 0.93 | 6.44 | 9.41 | 1450, 1560, 1980, 2050, 2200, |

The spectral bands found to be sensitive by the VIP for soluble carbohydrates and starch include the spectral regions of 1400, 1900, and 2070-2300 nm. These spectral regions are mainly related to oxygen and hydrogen chemical band and NSC content. These bands are also associated with the hydroxyl group's first overtone showing the spectral fluctuations from 1400-1600 nm spectral regions. These spectral regions are sensitive to hydrogen bonding, mainly in the starch molecule, which was predicted with higher accuracy than SC. The organic compounds identified in this study are mostly at the SWIR spectral regions (i.e., 2050, 2250 nm), which are also known to be related to the concentration of cellulose, glucose, starch, and lignin in different plant tissues.

Example 6

Figure 8:
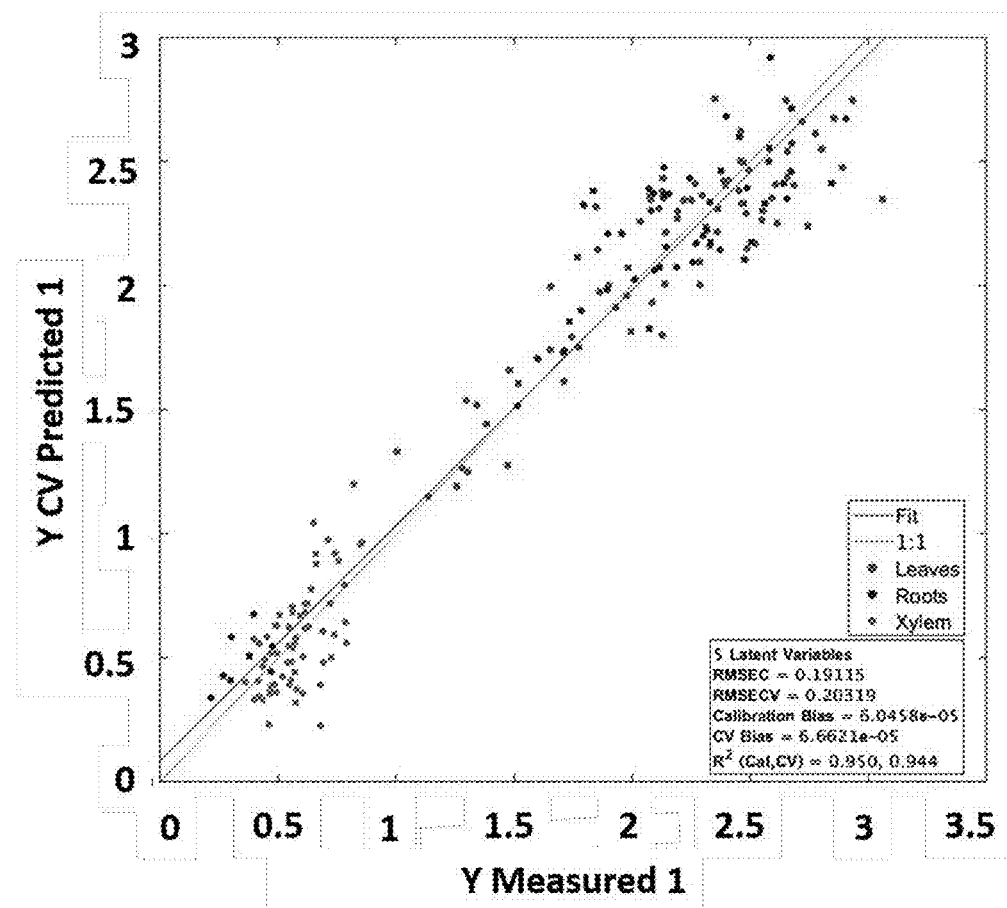
FIG. 8 depicts a scatterplot of partial least squares regression (PLSR) calibration and cross-validation curves, presenting the correlation between the spectral- and analytically-based measurements of nitrogen for cross-validation prediction.
Figure 9:
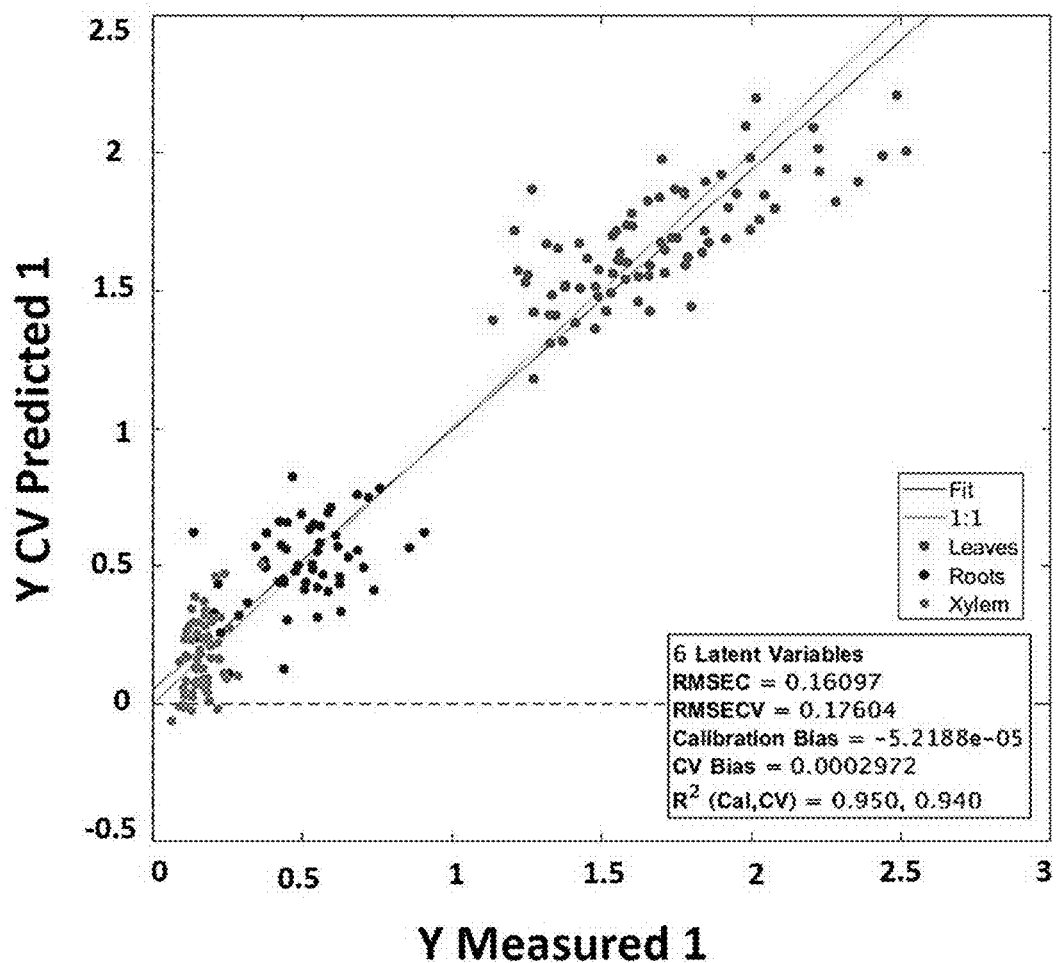
FIG. 9 depicts a scatterplot of partial least squares regression (PLSR) calibration and cross-validation curves, presenting the correlation between the spectral- and analytically-based measurements of potassium for cross-validation prediction.
Figure 10:
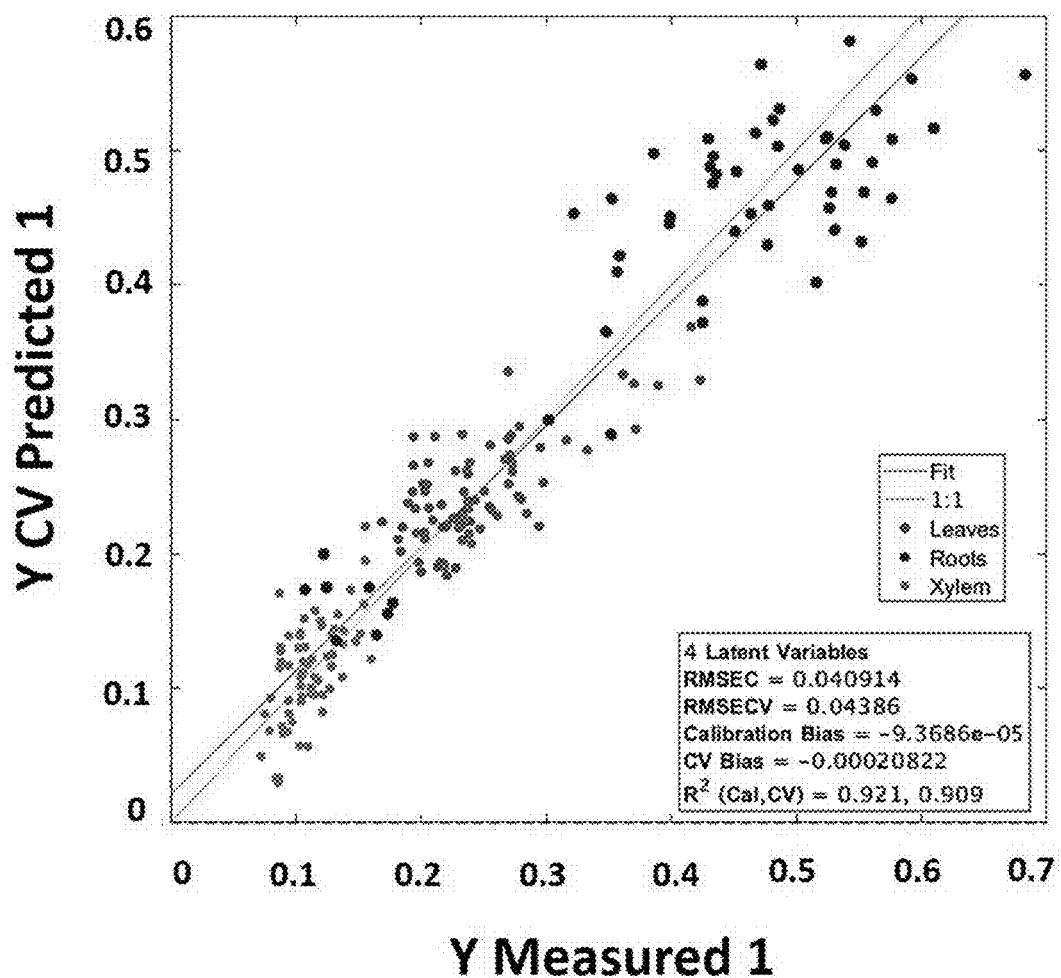
FIG. 10 depicts a scatterplot of partial least squares regression (PLSR) calibration and cross-validation curves, presenting the correlation between the spectral- and analytically-based measurements of phosphorus for cross-validation prediction.

FIGS. 8-10 graphically depict the correlation between plant tissue spectroscopy and nitrogen (FIG. 8), potassium (FIG. 9), and phosphors (FIG. 10) for cross-validation prediction. When all three plant tissues (branches, roots, and stems) were used in the PLS-R modeling, the $R^2$ for the nitrogen, potassium, and phosphors were 0.93, 0.93, and 0.91, respectively.

Example 7

Figure 11:
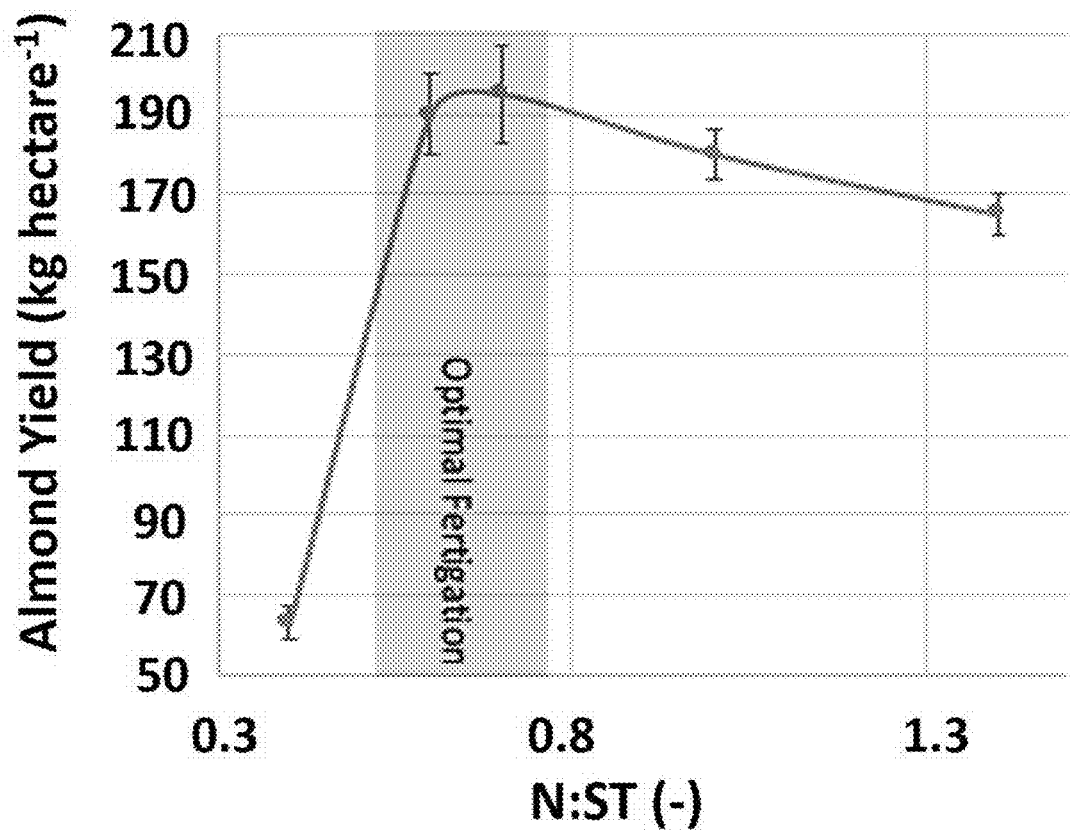
FIG. 11 graphically depicts the relation between almond yield and N/ST ratio as an index to assess optimal nitrogen concentration in leaves.

Reference is now made to FIG. 11, graphically presenting the relations between almond yield and the ratio between the nitrogen and starch (ST) levels in the leaves (referred to as N/ST index), which suggests the nutritional fertilization level for optimal yield for the different N-treatments. The results show that a high level of the index would result in lower yield. These results also indicate that the optimal level of N fertilization ranges between 0.5-0.8 N/ST values of the index.

Example 8

Figure 12:
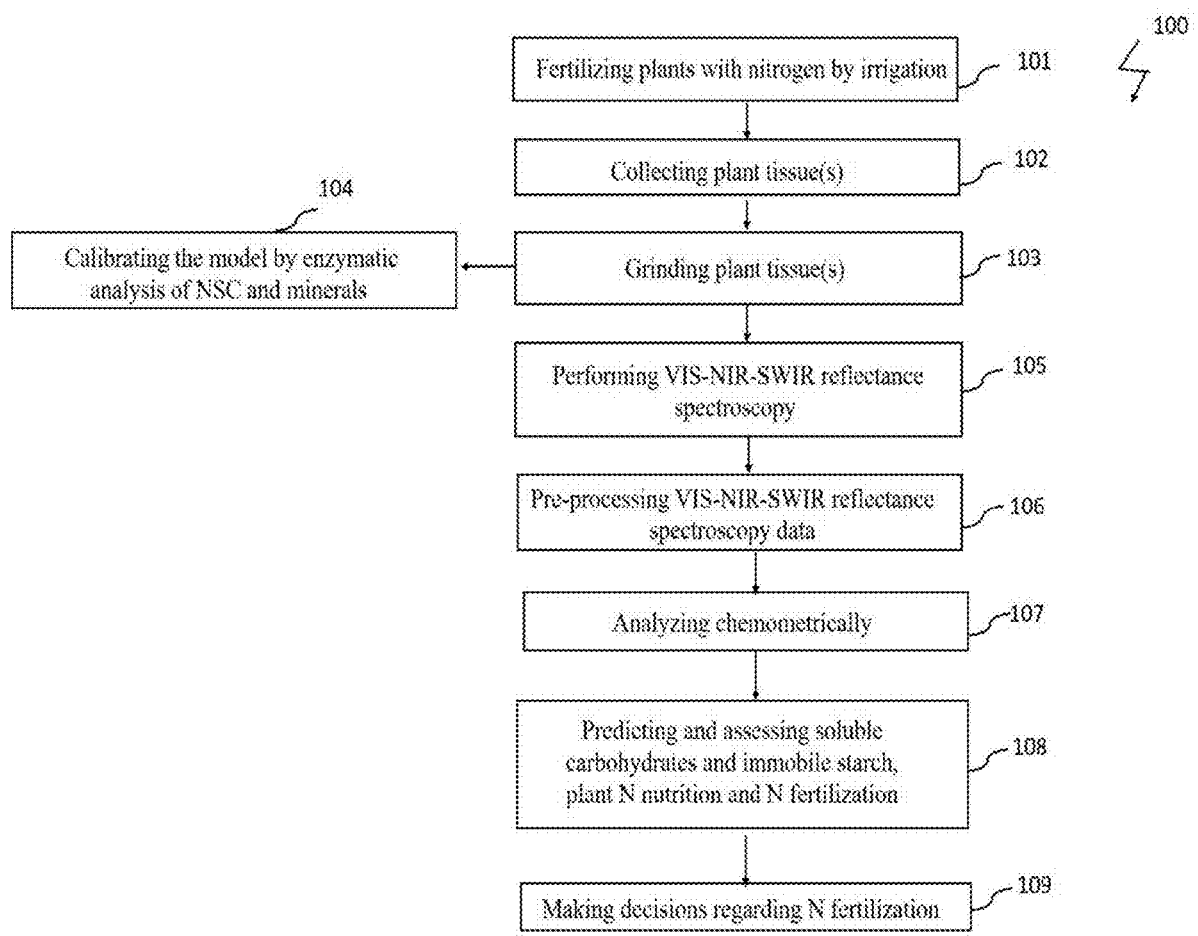
FIG. 12 depicts the method of the present invention for assessing N fertilization based on NSC-NIRS spectroscopy for precision nitrogen management using multivariate statistical approach.

Reference is now made to FIG. 12, schematically presenting the method (100) of the present invention. This method harnesses multivariate statistical approaches for assessing N fertilization based on NSC-NIR spectroscopy for precision N management. Once plants of a certain crop species are fertilized with nitrogen by irrigation (101), a dry plant tissue or a plurality of tissues, such as roots, branches, stems or leaves is/are collected (102), and subsequently ground (103). In parallel, the samples can be optionally further enzymatically analyzed in a laboratory setting in terms of NSC and minerals for model calibration (104). The following steps involve performing a visible-near infrared-shortwave (VIS-NIR-SWIR) reflectance spectroscopy of the ground tissues (105) and pre-processing data of said VIS-NIR-SWIR reflectance spectroscopy (106) by the statistical approaches disclosed in the present application. Subsequently, the plant samples are analyzed using chemometric techniques (107), so to enable the prediction and assessment of soluble carbohydrates and immobile starch, plant N nutrition and N fertilization (108). Once those assessments are obtained, it is possible to rely on them in drawing conclusions and making decisions concerning the nitrogen status and/or fertilization and irrigation management of the plants (109).

The invention claimed is:

1. A method for assessing nitrogen status in a plant comprising steps of:
   a. obtaining a sample from different plant parts or tissues;
   b. drying, digesting, and grinding said plant parts or tissues to a powder;
   c. measuring concentrations of predetermined materials of said powder; said predetermined materials selected from the group consisting of non-structural carbohydrates (NSC), soluble carbohydrates (SC), starch (ST), nitrogen (N), potassium (K), phosphorus (P), and any combination thereof;
   d. obtaining spectral data of said powder;
   e. correlating said obtained spectral data to concentrations and concentration ratios of predetermined materials; said concentration ratios selected from the group consisting of N, K, P and the ratio between N/SC, N/ST, and any combination thereof;
   f. conducting pre-processing transformations (PPTs) on said obtained spectral data; and
   g. calibrating said obtained spectral data against said concentrations and concentration ratios of predetermined materials by multivariate machine learning statistical models;
   wherein said multivariate machine learning statistical models are used to assess and predict crop nitrogen nutritional status and carbohydrate concentrations; said prediction is utilized to determine under fertilization and overfertilization based on redaction in starch levels decrease and yield of said crops.

2. The method of claim 1, wherein said plant is a tree selected from the group consisting of Magnoliophyta, Eudicotidae, Liliopsida, Magnolianae, Pinophyte, Ginkgophyte, Cycadophyte, and any combination thereof.

3. The method of claim 2, wherein said tree is a fruit tree, preferably an almond tree.

4. The method of claim 1, wherein said plant parts or tissues are selected from the group consisting of roots, stems, branches, leaves, fruits, seeds, flowers, inflorescences, and any combination thereof.

5. The method of claim 1, further comprising a step of treating said plant with fertilizers, preferably wherein said fertilizers comprise nitrogen.

6. The method of claim 1, wherein said obtaining of spectral data is carried out using reflectance spectroscopy based on a spectrometer.

7. The method of claim 6, wherein said spectrometer is configured to capture said spectral data in the visible, near-infrared, and shortwave infrared spectral regions (400-2500 nm).

8. The method of claim 1, wherein said obtained spectral data are reflectance signals at the 400-2,500 nm spectral range.

9. The method of claim 1, wherein said multivariate machine learning statistical models are selected from the group consisting of partial least-squares regression (PLSR), partial least-squares discriminant analysis (PLS-DA), and any combination thereof.

10. The method of claim 9, wherein predicting said PLSR evaluated by statistical parameters; said statistical parameters selected from the group consisting of latent variables (LVs), root mean squared error of calibration (RMSEC), and cross-validation (RMSECV), coefficient of determination (R-squared) values of predicted and observed sample relation and any combination thereof.

11. The method of claim 1, further comprising a step of applying a computer-implemented non-transitory software on said obtained spectral data.

12. The method of claim 1, wherein said concentration ratios comprise an index;
said index assessing and predicting said crop yield.

13. The method of claim 10, wherein said computer-implemented non-transitory software is selected from the group consisting of PLS toolbox in Matlab environment, R, Python, and any combination thereof.

14. The method of claim 1, wherein said PPTs selected from the group consisting of generalized least squares (GLS) weighting, auto-scaling, Savitzky-Golay (SG) algorithm, second derivatives, multiplicative signal correction (MSC) and any combination thereof.

* * * * *